US006235365B1

(12) United States Patent
Schaughency et al.
(10) Patent No.: US 6,235,365 B1
(45) Date of Patent: May 22, 2001

(54) WATERPROOFING MEMBRANE HAVING RELEASE SHEET CUTTING SYSTEM

(75) Inventors: Edwin C. Schaughency, Pasadena; George W. Starsmeare, Millersville, both of MD (US); Walter W. Wydra, Itasca, IL (US)

(73) Assignee: W. R. Grace & Co.-Conn., New York, NY (US)

( * ) Notice: Subject to any disclaimer, the term of this patent is extended or adjusted under 35 U.S.C. 154(b) by 0 days.

(21) Appl. No.: 09/215,444

(22) Filed: Dec. 18, 1998

(51) Int. Cl.[7] .......... B32B 7/06

(52) U.S. Cl. .......... 428/40.1; 52/99; 52/309.1; 52/309.3; 52/309.16; 52/412; 52/746.11; 428/40.3; 428/40.5; 428/41.6; 428/41.8; 428/42.1; 428/42.2; 428/43; 428/67; 428/114; 428/492

(58) Field of Search .......... 428/40.3, 40.1, 428/41.8, 43, 42.2, 40.5, 41.6, 42.1, 67, 114, 492; 52/99, 309.1, 412, 309.3, 309.16, 746.11

(56) References Cited

U.S. PATENT DOCUMENTS

| | | | | |
|---|---|---|---|---|
| 2,005,665 | * | 6/1935 | Saignier | 229/51 |
| 2,771,385 | * | 11/1956 | Humphner | 154/53.5 |
| 3,034,941 | * | 5/1962 | Hessenthaler | 428/42.1 |
| 3,741,856 | | 6/1973 | Hurst | 161/88 |
| 3,770,559 | | 11/1973 | Jackson | 161/89 |
| 3,900,102 | | 8/1975 | Hurst | 206/411 |
| 4,172,830 | | 10/1979 | Rosenberg et al. | 428/245 |
| 4,301,204 | | 11/1981 | McCusker et al. | 428/110 |
| 4,315,392 | | 2/1982 | Sylvest | 52/309.1 |
| 4,368,228 | | 1/1983 | Gorgati | 428/110 |
| 4,396,665 | | 8/1983 | Rowe | 428/148 |
| 5,916,654 | * | 6/1999 | Phillips et al. | 428/42.2 |

FOREIGN PATENT DOCUMENTS

| | | | | |
|---|---|---|---|---|
| 861467 | | 1/1971 | (CA) . | |
| 1230753 | | 2/1967 | (GB) . | |
| 1230755 | | 2/1967 | (GB) . | |
| 1230756 | | 2/1967 | (GB) . | |
| 1400385 | | 7/1975 | (GB) . | |
| 1548394 | | 7/1979 | (GB) . | |
| WO-89/03765 | * | 5/1989 | (WO) | 428/42.2 |

OTHER PUBLICATIONS

Lewis, Richard L., Hawley's Condensed Chemical Dictionary, Thirteenth Edition, pp. 811–812, Jan. 1997.*

* cited by examiner

*Primary Examiner*—Nasser Ahmad
(74) *Attorney, Agent, or Firm*—Craig K. Leon; William L. Baker

(57) ABSTRACT

An improved waterproofing membrane comprising a preformed waterproofing adhesive layer, releasable sheet liner, and a string or plurality of strings operative to cut the release sheet liner into smaller portions for selective removal to expose portions of the adhesive layer for installation onto a building surface or civil engineering surface.

25 Claims, 1 Drawing Sheet

WATERPROOFING MEMBRANE HAVING RELEASE SHEET CUTTING SYSTEM

FIELD OF THE INVENTION

The present invention relates to a preformed, sheet-like waterproofing membrane laminate having a release sheet liner that can be cut using one or more strings contained and/or embedded within the membrane laminate structure.

BACKGROUND OF THE INVENTION

It is known in the waterproofing art to combine a preformed waterproofing membrane, such as a rubberized bitumen layer, with a carrier support layer. The carrier support layer may comprise a variety of materials, such as rubber, plastic, and/or metal. It has also been desirable to employ cross-laminated plastic films, such as high density polyethylene, or felts or non-woven sheets as carrier supports for improved stability of the membrane. Such preformed waterproofing membrane laminates are considered "sheet-like" because they are sufficiently flexible that they can be rolled up and transported after manufacture to the job site where they are unrolled and installed on the building surface.

Although such waterproofing membranes provide a considerable improvement in handling and installation when compared to the hot-applied waterproofing of decades ago, the membranes do provide some challenges in that they are often sold in three-foot widths which sometimes makes application difficult. This difficulty is due, in large part, to the tenacity of the waterproofing adhesive.

The preformed adhesive layer of waterproofing membranes are typically protected by a release sheet liner, made of waxed paper or plastic, which may be peeled from the adhesive at the time of application. The use of split, or perforated, release sheets are known in the waterproofing arts. For example, U.S. Pat. No. 4,172,830 of Rosenberg and Gaidis disclosed waterproofing membranes in which release sheets were perforated so that strips could be removed from the adhesive layer, and exposed portions of the adhesive could be overlaid onto the back of an adjacent, installed membrane. This was believed to increase the handling and installation ease of the membranes.

The use of a split release sheet is particularly useful for membrane application in detail areas, such as roof valleys. It is also useful when the membrane is applied as a flashing material around windows and doors, because a portion of the membrane can be affixed into position, while the remaining portion of the membrane is covered by the release sheet and is not capable of fouling (sticking to itself) or prematurely adhering to surfaces.

However, it is quite possible that in some detail areas the use of split release liner sheets can hinder application, since the applicator would have to deal with two portions of the release sheet if he or she wishes to expose at once the entire face of the adhesive layer for attaching the waterproofing membrane to a surface. Pre-split release sheets require that the applicator remove both split portions at once during application on flat (non-detail) areas, and this can make control and accurate placement difficult.

In view of the disadvantages of the prior art, the present inventors believe that a novel waterproofing membrane release sheet liner system is needed.

SUMMARY OF THE INVENTION

In surmounting the disadvantages of the prior art, the present invention provides an improved waterproofing membrane having at least one string for cutting a portion of the release sheet liner at the application site.

One of the objectives of the invention is to provide a waterproofing membrane that avoids the disadvantage of pre-split release sheet liners that make it difficult to install an entirely exposed adhesive layer at once.

Another objective of the invention is to provide the ability for the applicator to cut a portion of the release sheet liner at the application site, to facilitate the application of the membrane. In preferred embodiments, more than one string can be used so that the area of the waterproofing adhesive face to be exposed can be controlled.

Another objective of the invention is to provide convenience and flexibility in applying waterproofing membranes to detail areas (e.g., non-flat surfaces) and also to areas around doors, windows, and other discontinuities in the building surface or other civil engineering surface.

Accordingly, an exemplary improved waterproofing membrane of the present invention comprises a pre-formed, sheet-like waterproofing adhesive layer which is releasable attached to a release sheet liner, and at least one string operative, when pulled away from said adhesive layer, to cut said release sheet liner, whereby a portion of said cut release sheet liner may be removed from said adhesive layer. Preferably, the waterproofing adhesive layer further comprises a carrier support layer, such as a continuous polymeric film. Where a continuous film is used as the carrier support, the string or strings will be positioned within the membrane laminate between the carrier support layer and the release sheet liner, usually entirely or partially embedded within the waterproofing adhesive layer.

The present invention also provides a method for installing sheet-like waterproofing membranes and for manufacturing such membranes.

DETAILED DESCRIPTION OF EXEMPLARY EMBODIMENTS

Figure 1:
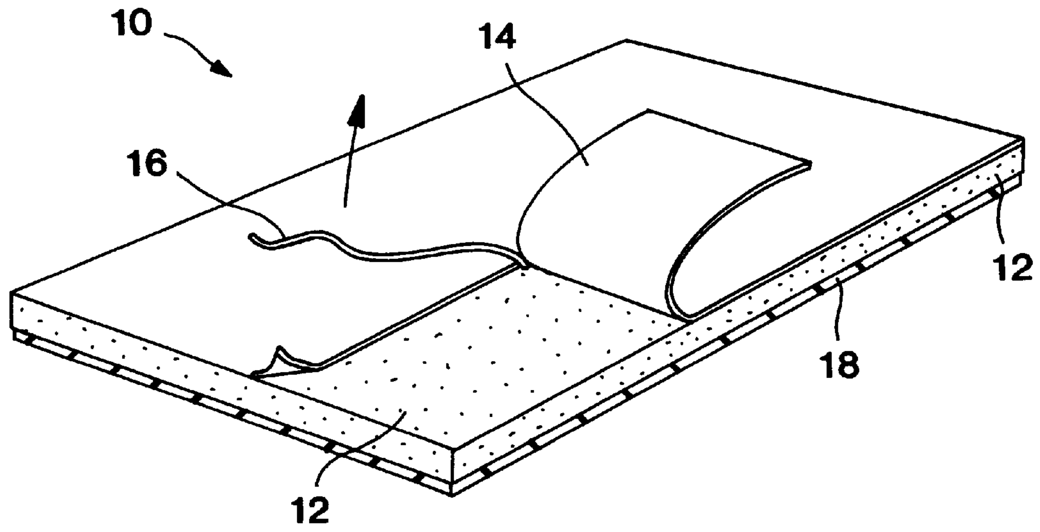
FIG. 1 is a cross-sectional view of an exemplary waterproofing membrane of the present invention.

As shown in FIG. 1, an exemplary improved waterproofing membrane 10 of the present invention comprises a pre-formed, sheet-like waterproofing adhesive layer 12 having a first major face adjacent to, or directly attached to, a release sheet liner 14 that is releasably attached to the membrane 10. At least one string 16, or more a plurality of strings, positioned beneath the release sheet liner 14, are operative, when pulled away from the adhesive layer 12, to cut the release sheet liner into smaller portions for selective partial removal if and when desired. The string 16 is preferably oriented along the length of the membrane 10, in the so-called "machine" direction, because this will facilitate both the manufacture and application of the membrane 10. Where a number of strings 16 are employed, they should be spaced at intervals across the width of the membrane 10 so that variously-sized portions of the release sheet liner 14 may be cut by pulling on the appropriate string.

The term "string" as used herein is not intended to be limiting but means and refers to thin cords, monofilaments, strands (including single or multi-strands), or lines or even wires which are operative to cut or tear the release sheet liner when pulled in a direction away from the waterproofing adhesive layer. Preferably, the string has a thickness which is a fraction of the waterproofing adhesive layer thickness (total), but the string may have a similar or identical thickness so long as it can still cut or tear through the release sheet liner when pulled by hand. Presumably, thin line will work best because it will tear/cut the release sheet most effectively and cleanly.

An exemplary waterproofing membrane 10, as shown in FIG. 1, preferably comprises a carrier support sheet 18, which can be attached to a major face of the adhesive layer 12 opposite the other major face to which the release sheet liner 14 is attached. The carrier support sheet 18 can also be embedded (e.g., as a scrim) within the adhesive layer 12.

The carrier support sheet 18, waterproofing adhesive layer 12, and release sheet liner 14 may be comprised of materials such as are conventionally known in the waterproofing art. Thus, the carrier 18 may be a continuous film made of paper, polymer, metal, glass, fabric (e.g., non-woven), felt, or mixture thereof, attached to the adhesive layer 12 and/or embedded therein. Preferably, the carrier support 18 comprises a polyolefin polymer (e.g., cross-laminated or oriented polyethylene or polypropylene). Exemplary waterproofing adhesive layers 12 may comprise bituminous materials (e.g., rubber-modified bitumen) or non-bituminous synthetic adhesive materials (e.g., SIS, SEBS, butyl rubber, etc.) as known in the art. Exemplary release sheet liners 16 may comprise waxed or siliconized paper or plastic film or other known materials.

Examples of waterproofing membranes, and methods of using and making them, are disclosed in U.S. Pat. No. 3,741,856 of Hurst; U.S. Pat. No. 3,900,102 of Hurst;

U.S. Pat. Nos. 4,172,830 and 4,421,623 of Rosenberg and Gaidis; U.S. Pat. No. 4,751,122 of Basil J. May; and Canadian Pat. No. 861467 of Geoffrey Davis, all of which are fully incorporated by reference herein. Pre-formed, sheet-like waterproofing membranes are commercially available for use in sub-grade installations from W. R. Grace & Co.-Conn., Cambridge, Mass., under the trade name BITUTHENE®. Roofing membranes are also available from Grace under the trade names ICE & WATER SHIELD® and VYCOR®.

Again, it is preferred that the string 16 be relatively thinner gauge than the waterproofing adhesive layer. The string should be of sufficient strength and tenacity to pull through and tear the release liner 14 without breaking. Examples of suitable string are fishing line, such as 10–25 pound line, or dental floss string, which may optionally be coated with wax, silicone, or other friction-reducing material, to facilitate removal or peeling from the waterproofing adhesive 12. The string could comprise nylon, metal, cotton, hemp, glass, or other tough material, depending on the nature of the release sheet liner material used.

An exemplary method of the invention for installation of a waterproofing membrane 10 comprises providing a membrane, as above described, and cutting a portion of the release sheet liner 14 with a string 16. A portion of the release sheet is removed, such that an uncut portion of the release sheet 14 can be removed at a subsequent time.

In further exemplary membranes 10 of the invention, a very large number of parallel strings (preferably not in contact with each other) can be employed, for example located between the adhesive layer 12 and release sheet liner 14, to decrease the surface area of the adhesive layer 12 when it is exposed.

One method of the invention for making an exemplary waterproofing membrane 10 is to melt-coat waterproofing adhesive onto the waxed or siliconized surface of the release sheet liner 14 on which the string or strings 16 are positioned (or releasably attached such as by wax droplets, adhesive, and/or tape). Another exemplary manufacturing method involves forming the waterproofing adhesive layer 12, and thereafter embedding at least one string in the formed adhesive layer 12 and/or disposing at least one string against the surface of the adhesive layer.

In further exemplary membranes, a plurality of strings are positioned between the adhesive layer 12 and release liner 14, while another plurality of strings are embedded within the adhesive layer 12. As a practical matter, since the waterproofing adhesive is extremely viscous, strings initially placed "between" the adhesive layer and release liner may become partially or totally embedded in the waterproofing adhesive in any event, since the adhesive will tend to flow around the string. String which is taped against the release sheet liner may have less of a tendency to become entirely embedded within the adhesive layer. However, it is believed that the invention will work even if the strings are located away from the release sheet liner, such as being initially positioned or located between the carrier support sheet (if attached to a major face of the waterproofing adhesive layer) and the waterproofing adhesive layer.

In other exemplary embodiments, a portion of string length can extend beyond an edge of the waterproofing membrane to facilitate grabbing the string and pulling it so as to cut the release sheet liner into portions. The string may have a color that is different than the color of the waterproofing adhesive or release sheet liner to facilitate visual detection of the string by the applicator. In further exemplary embodiments, the outer face of a releasably-attached release sheet liner may contain markings or indicia to suggest to the applicator the location of the cutting string within the membrane laminate.

The foregoing exemplary embodiments are provided for illustrative purposes only, and are not intended to limit the scope of the invention.

We claim:

1. A waterproofing membrane comprising:

a carrier support sheet comprising a continuous film comprising a polyolefin polymer;

a preformed waterproofing adhesive layer comprising a rubber-modified bitumen or a nonbituminous synthetic adhesive, said waterproofing adhesive layer having a first major side and a second major side opposite said first major side; said first major side thereof being attached to said continuous carrier support sheet;

a release sheet liner releasably attached to said second major side of said preformed waterproofing adhesive layer, said liner comprising waxed or siliconized paper; and at least one string having a gauge thinner than said preformed waterproofing adhesive layer, said at least one string disposed between said carrier support sheet and said waxed or siliconized paper release sheet liner, said at least one string being operative, when pulled away from said waterproofing adhesive layer, to cut said paper release sheet liner into smaller portions, whereby a cut portion of said release sheet may be removed from said adhesive layer and said carrier support sheet.

2. The waterproofing membrane of claim 1 wherein said release sheet liner comprises a silicone coated release paper and said waterproofing adhesive layer comprises a rubber modified bitumen.

3. The waterproofing membrane of claim 1 further comprising a plurality of strings operative to cut various portions of said release sheet liner.

4. The waterproofing membrane of claim 1 wherein said membrane comprises at least two strings operative to cut different portions of said release sheet liner, said at least two strings being parallel to each other.

5. The waterproofing membrane of claim 1 wherein said at least one string is located between said preformed waterproofing adhesive layer and said release sheet liner.

6. The waterproofing membrane of claim 1 wherein said at least one string is embedded in said preformed waterproofing adhesive layer.

7. The waterproofing membrane of claim 1 wherein a first plurality of strings is disposed between said preformed waterproofing adhesive layer and said release sheet liner, and a second plurality of strings is embedded within said preformed waterproofing adhesive layer.

8. The waterproofing membrane of claim 1 wherein said at least one string is made from a material comprising hemp, cotton, nylon, glass, metal, or combination thereof.

9. The waterproofing membrane of claim 1 wherein said at least one string is coated.

10. The waterproofing membrane of claim 1 wherein said at least one string comprises nylon.

11. The waterproofing membrane of claim 10 wherein said at least one nylon string is monofilament and is coated with wax or silicone.

12. Method of making a waterproofing membrane laminate comprising: providing a waterproofing adhesive layer comprising a rubber-modified bitumen or non-bituminous synthetic polymer, said waterproofing adhesive layer having a first major side and a second major side opposite said first major side, said first major side thereof being attached to a carrier support sheet comprising a continuous polyolefin polymer film, and a releasable sheet liner comprising a waxed or siliconized paper, and incorporating between said continuous polymer film carrier support sheet and releasable paper sheet liner a waterproofing adhesive layer and at least one string having a gauge thinner than said waterproofing adhesive layer, said at least one string being operative to cut said releasable paper sheet liner into smaller portions when said string is pulled away from said waterproofing adhesive layer.

13. The method of claim 12 wherein said waterproofing adhesive layer is provided by melt-coating a waterproofing adhesive material comprising a rubber modified bitumen or a non-bituminous adhesive onto a release sheet liner having said at least one string positioned thereon.

14. The method of claim 13 further comprising positioning a plurality of strings on said release sheet liner prior to melt-coating said waterproofing adhesive material onto said release sheet liner.

15. A method of installing a waterproofing membrane on a building or civil engineering surface comprising: providing at the application site the waterproofing membrane of claim 1, and pulling on said at least one string in a direction away from said waterproofing adhesive layer to cut a portion of said waxed or siliconized paper release sheet liner.

16. The method of claim 15 comprising cutting said release sheet liner, removing the cut portion thereof to expose a portion of said waterproofing adhesive layer, and applying the exposed portion of said waterproofing adhesive layer to a building or civil engineering surface.

17. The waterproofing membrane of claim 1 wherein said at least one string is oriented in the machine direction of the membrane.

18. The waterproofing membrane of claim 1 wherein said at least one string extends beyond the edge of said preformed waterproofing adhesive membrane.

19. The waterproofing membrane of claim 1 wherein said at least one string has a color different from said preformed waterproofing adhesive layer.

20. The waterproofing membrane of claim 17 wherein said release sheet liner has a marking to indicate the location of said at least one string.

21. A waterproofing membrane comprising:

a carrier support sheet comprising a continuous film comprising a polyolefin polymer;

a preformed waterproofing adhesive layer comprising rubber modified bitumen or a non-bituminous synthetic adhesive, said waterproofing adhesive layer having a first major side attached to said carrier support sheet and a second major side opposite said first major side;

a release sheet liner that is releasably attached to said second major side of said preformed waterproofing adhesive layer, said liner comprising a waxed or siliconized paper; and at least two strings having gauges thinner than said preformed waterproofing adhesive layer, and said at least two strings being disposed between said polymeric carrier support sheet and said paper release sheet liner, said at least two strings being parallel to each other and operative, when pulled away from said waterproofing adhesive layer, to cut said release sheet liner into portions, whereby a portion of said release sheet may be removed from said adhesive layer.

22. The waterproofing membrane of claim 21 wherein said at least two parallel strings are made of nylon.

23. The waterproofing membrane of claim 21 wherein said at least two parallel strings are coated.

24. The waterproofing membrane of claim 21 wherein said release sheet liner is marked to indicate the location of said at least two parallel strings.

25. The waterproofing membrane of claim 21 wherein said at least two strings have a color different from said waterproofing adhesive layer.

* * * * *